Dec. 27, 1938.   C. M. PIGLIA   2,141,486
APPARATUS FOR CULTIVATING CELERY WITH WHITE STALKS
Original Filed Sept. 10, 1936
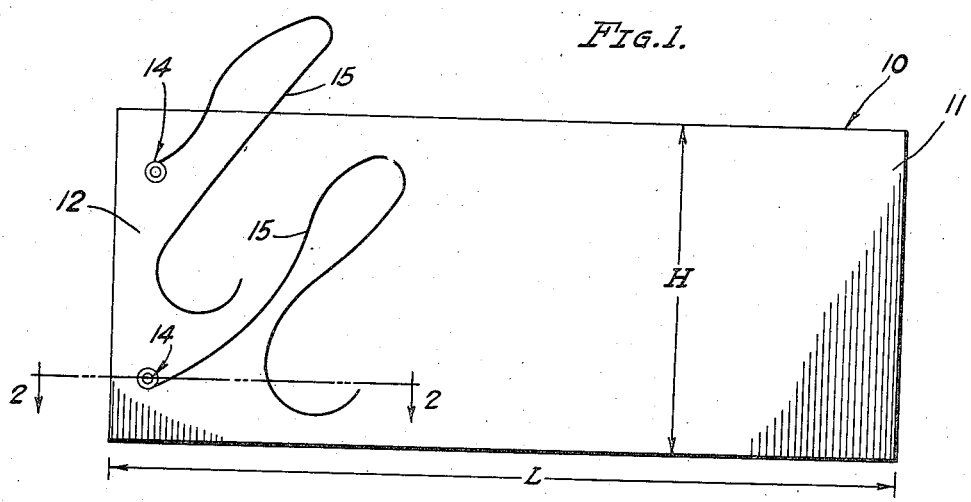
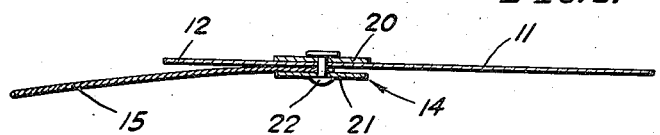
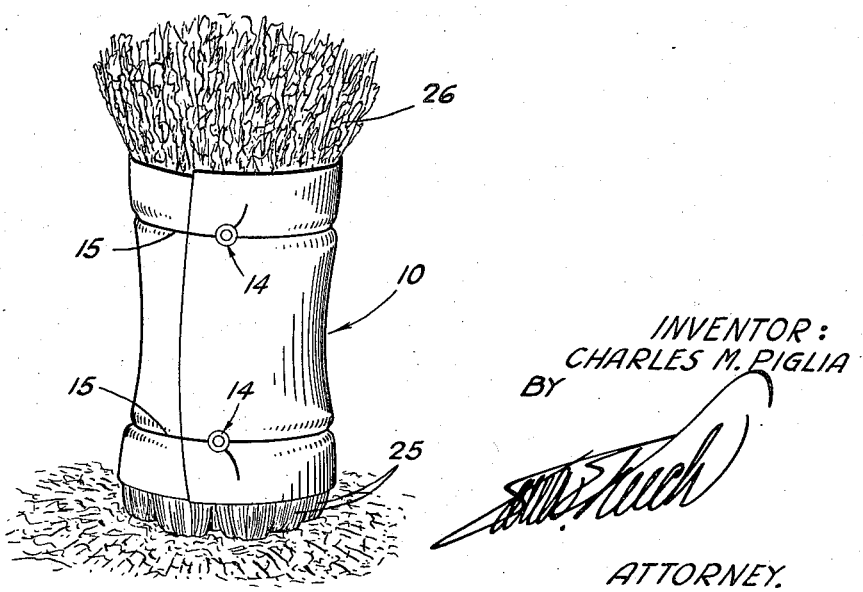
INVENTOR:
CHARLES M. PIGLIA
BY
ATTORNEY.

Patented Dec. 27, 1938

2,141,486

UNITED STATES PATENT OFFICE 2,141,486

APPARATUS FOR CULTIVATING CELERY WITH WHITE STALKS

Charles M. Piglia, Los Angeles, Calif., assignor to Plant Protectors, Inc., Los Angeles, Calif., a corporation of Delaware Application September 10, 1936, Serial No. 100,061
Renewed May 21, 1938

1 Claim. (Cl. 47—3)

This invention relates to the agricultural art and particularly to the art of cultivating celery.

In the cultivation of celery certain varieties which are among the best for table use from the standpoint of tenderness and tastiness, mature with a rather ugly yellowish green color in the stalks. In spite of the superior eating qualities of these varieties of celery it is difficult to market these in competition with other varieties of celery less desirable from the eating standpoint but which are a pure white or very light yellow in color.

It is accordingly an object of my invention to provide a method of and apparatus for cultivating varieties of celery, the stalks of which are naturaly green, to cause these stalks to be substantially white when matured.

The manner of accomplishing the foregoing object, as well as further objects and advantages, will be made manifest in the following description taken in connection with the accompanying drawing, in which:—

Fig. 1 is a plan view of one of the celery bleachers of my invention.

Fig. 2 is an enlarged detail cross sectional view taken on the line 2—2 of Fig. 1.

Fig. 3 is a perspective view illustrating the celery bleacher of my invention applied to one or more stalks of celery in carrying out the method of my invention.

The method of my invention consists in shielding stalks of celery from light from the time these are approximately one half to three quarters fully developed until the time when these are mature and the celery ready to harvest. At the same time the stalks are thus shielded the leaves of the celery are allowed to remain in the open exposed to the sunshine. I have found that as a result of this method of cultivating those varieties of celery the stalks of which are normally green when mature these stalks when harvested will be a beautiful creamy white.

The apparatus of my invention and its use in performing the method of my invention are illustrated in the drawing, this apparatus comprising what may become known in the art as a "celery bleacher" 10. This bleacher includes a sheet of paper 11 having a height H of which is preferably in various sizes and which is adapted to reach from the ground to the leaves of stalks of celery when such stalks have substantially one half to three quarters of their growth. The length L of the sheet is such as to permit this sheet to be wrapped around a group of several stalks of celery and have the opposite ends of this sheet overlap each other.

An end portion 12 of the sheet 11 is provided with a pair of buttons 14 to which are attached strings 15. As shown in Fig. 2 each of the buttons 14 includes a stiff cardboard washer 20 disposed behind the sheet 11, a cardboard washer 21 disposed in front of the sheet 11 and a rivet 22 which extends through these two washers and joins them and the sheet 11 together. The washer 20 is preferably glued with a waterproof glue to the sheet 11. Each of the strings 15 is tied to the rivet 22 of its respective button 14 between the washer 21 thereof and the sheet 11.

The sheet 11 is preferably waterproofed and may be tinted a blue or a green so as to particularly exclude light rays of these wave lengths.

In carrying out the method of my invention the sheet 11 of the celery bleacher 10 is wrapped around a group 25 of stalks of celery so as to shield the stalks thereof from the direct rays of light and allow the leaves 26 thereof to remain in the open and subject to both direct and diffused rays of sunlight. After the sheet of paper 11 has thus been wrapped around stalks of celery 25 with the ends of the sheet overlapping as shown in Fig. 3 the strings 15 are wrapped around the paper 11 and the ends of the strings wound about the rivets 22 of the buttons 14 between the washer 21 and the paper 11. The celery bleacher 10 is thus secured in place on the celery stalks 25 so as to carry out the method of my invention. As the celery stalks 25 grow, it is necessary for the attendant to occasionally unwind the ends of the strings 15 from the buttons 14 and after permitting the celery stalks 25 to expand somewhat, refasten the strings 15 onto the buttons 14.

As the celery grows there is a tendency for the bleacher 10 to be lifted above the ground as shown in Fig. 3 so as to expose the lower ends of the stalks 25. When this happens it will be necessary for the culturist to slip the bleacher 10 downwardly so that its lower edge is substantially in contact with the ground. The increase in the extent of the foliage 26 as the stalks 25 grow casts a shadow over the upper ends of the stalks so that the downward movement of the bleacher 10 does not substantially reduce the shelter given the upper ends of the stalks 25 so as to prevent these developing the objectionable green color.

When the stalks of celery 25 are entirely matured and ready for harvest the strings 15 are released from the buttons 14, the celery bleacher 10 is removed and discarded or stored to be used again and the stalks of celery 25 are harvested.

These stalks are now a beautiful white color throughout their length without any loss of the superior eating qualities normally possessed by these particular varieties of celery. In other words, the eating qualities of these varieties of celery are not impaired in any way by the bleaching method of my invention.

What I claim is:—

As an article of manufacture, a celery bleacher comprising a sheet of flexible material capable of acting as a light filter to filter out chemically potent rays of sunlight, a plurality of filamentary tie buttons on said sheet, and filamentary tie members secured with said buttons to said sheet, said tie members being adapted to extend about said sheet when the latter is used to encase one or more celery stalks and tie on said buttons so as to secure said sheet about said stalks.

CHARLES M. PIGLIA.